Figures 1, 2:
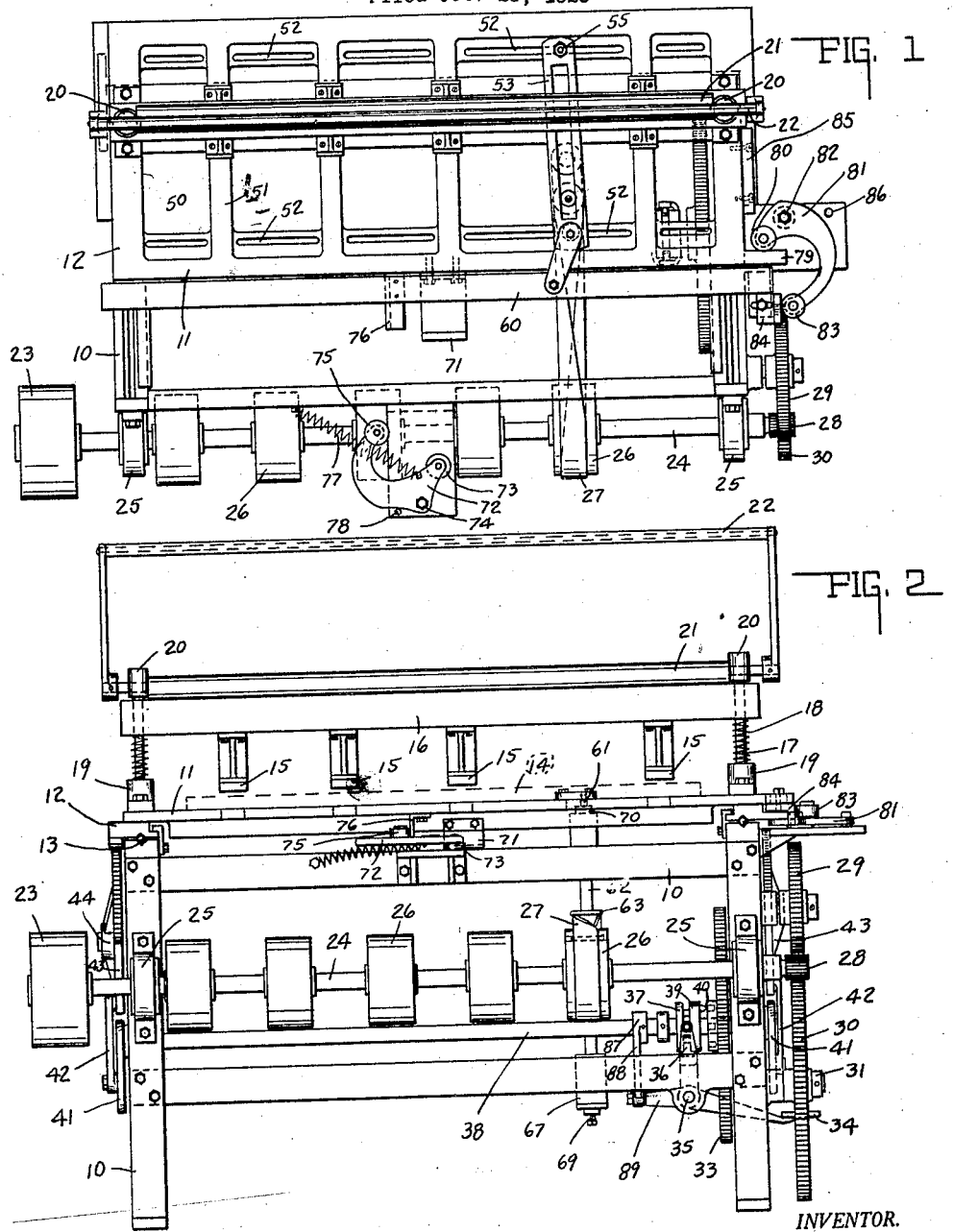

Dec. 16, 1924.
H. W. BERTRAM
1,519,753
MACHINE FOR MAKING WEDGE TENON DOVETAIL JOINTS
Filed Oct. 29, 1923   3 Sheets-Sheet 1

INVENTOR.
HENRY W. BERTRAM.
BY
ATTORNEYS.

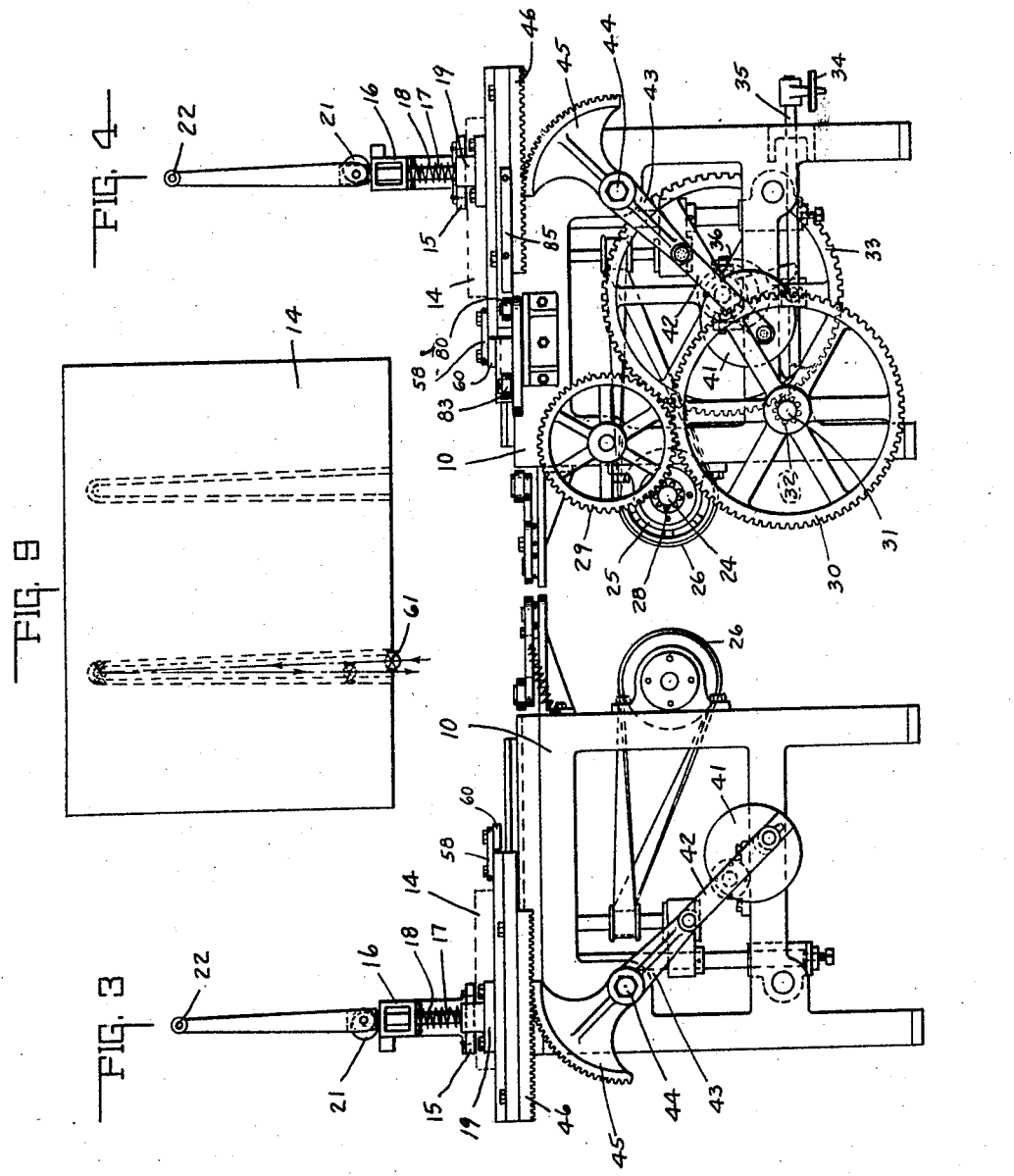

Dec. 16, 1924.
H. W. BERTRAM
1,519,753
MACHINE FOR MAKING WEDGE TENON DOVETAIL JOINTS
Filed Oct. 29, 1923    3 Sheets-Sheet 3
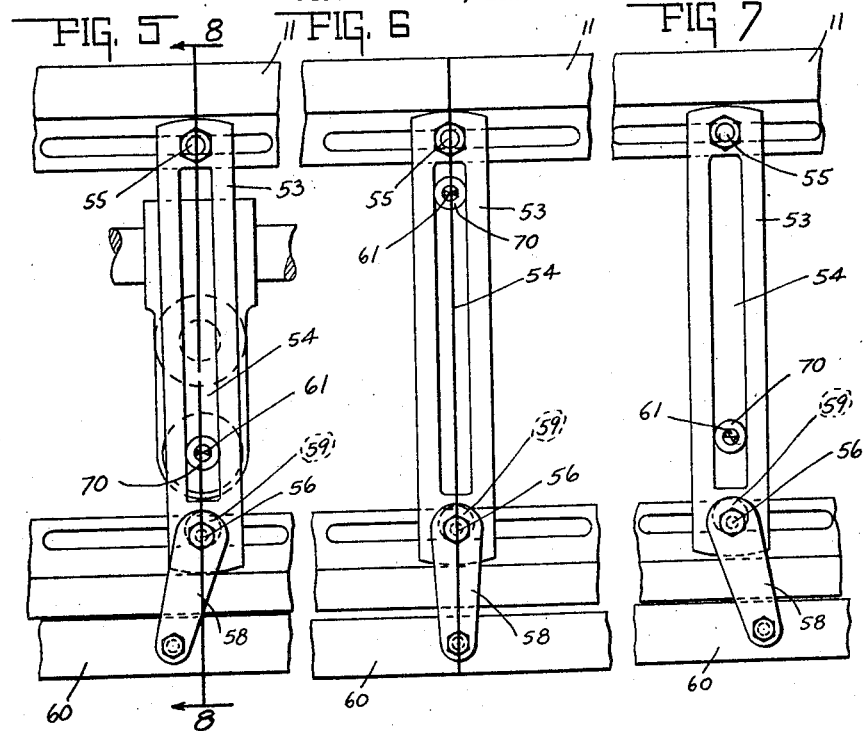
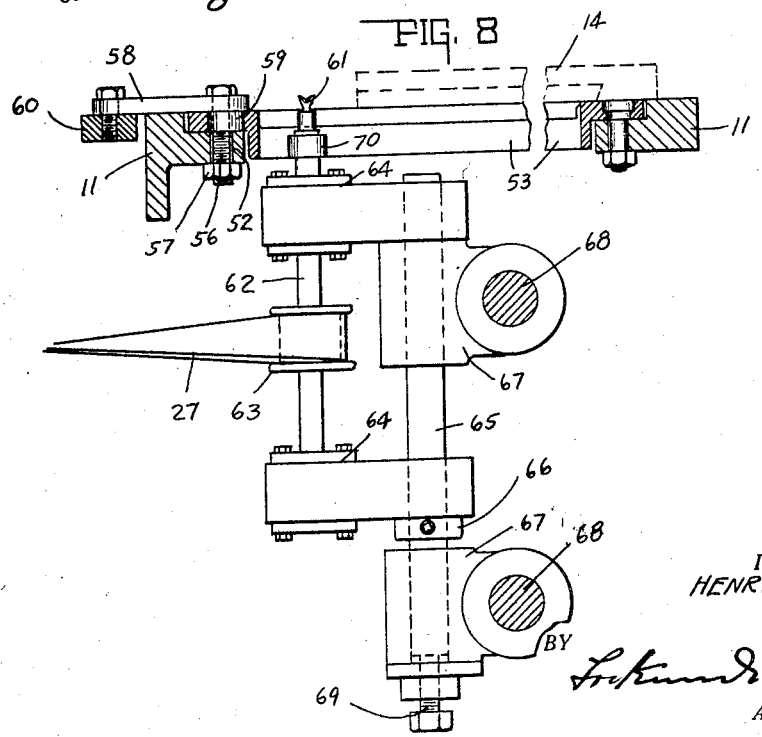
INVENTOR.
HENRY W. BERTRAM.
BY
ATTORNEYS.

Patented Dec. 16, 1924.

1,519,753

UNITED STATES PATENT OFFICE.

HENRY W. BERTRAM, OF ELWOOD, INDIANA.

MACHINE FOR MAKING WEDGE TENON DOVETAIL JOINTS.

Application filed October 29, 1923. Serial No. 671,510.

*To all whom it may concern:*

Be it known that I, HENRY W. BERTRAM, a citizen of the United States, and a resident of Elwood, county of Madison, and State of Indiana, have invented a certain new and useful Machine for Making Wedge Tenon Dovetail Joints; and I do hereby declare that the following is a full, clear, and exact description thereof, reference being had to the accompanying drawings, in which like numerals refer to like parts.

This invention relates to a wood working machine adapted for cutting grooves in wooden work, and particularly dovetail grooves where the tongue and groove connection of this type is desired. This type of connection is generally employed in cabinet work particularly for partitions, drawer supports and the like, although it may be used equally as well in not only wooden structures but in metal structures or the like.

It is the object of this invention to provide a machine which will not only cut the dovetail groove in the female member but will cut the dovetail groove with a taper so as to permit a wedging action between the male and female members. By means of this invention, the groove may be cut wider at the front than at the rear; and by cutting the tongue or male member in the same fashion and sliding it into such a groove, the two members will become firmly wedged together, as well as held firmly by the dovetail tongue and groove connection. This not only facilitates assembling the parts, but maintains them fixedly in relation to each other, as will be apparent to those familiar with the art.

The main feature of the invention resides in the arrangement of the support for the work and the cutter head for grooving the same, wherein it will cut a groove wider at the front than at the rear, or a groove which will taper rearwardly as well as be of the usual dovetail formation.

Other features of the invention reside in the mechanism and construction of the machine, as will be hereinafter more fully set forth in the specifications and claims.

It will be observed that the invention not only applies to the dovetail type of groove, but to any other type of groove or the like, whether cut in wood or metal.

The full nature of the invention will be understood from the accompanying drawings and the following description and claims.

In the drawings, Fig. 1 is a top plan view looking down on the machine. Fig. 2 is a front elevation thereof. Fig. 3 is an end elevation showing one end of the machine. Fig. 4 is an end elevation showing the opposite end of the machine. Fig. 5 is an enlarged detail view showing the cutter guide in the position taken at the beginning of the cutting operation. Fig. 6 is the same as Fig. 5 showing the cutter guide in position when the movement of the work is reversed. Fig. 7 is the same as Figs. 5 and 6 showing the cutter guides in position taken at the finish of the cutting operation. Fig. 8 is a section taken on the line 8—8 of Fig. 5 with parts of the machine removed. Fig. 9 is a diagrammatical illustration of the work showing the path of the cutter head and a finished groove cut by the machine.

In the drawings there is shown a tapered groove cutting machine mounted upon the frame 10 and having a reciprocating table 11 supported on the end bars 12 which are adapted to ride backward and forward upon the ball bearings 13 carried by the top cross bars of the frame 10. Suitable mechanism is provided for causing said table to reciprocate back and forth as will be hereinafter more fully described.

The table 11 is adapted to support the work 14 in the under side of which tapered grooves are to be cut as said table reciprocates back and forth on the frame 10. For clamping the work 14 upon the table, there are a plurality of clamping shoes 15 suspended from an overhead supporting bar 16 which is mounted at its ends upon the supporting standards 17 which are secured to and extend upwardly from said table 11. The bar 16 is normally maintained in its upper position so as to hold the clamping shoes free from the work by the springs 18 which surround the standards 17 and are positioned between the bars 16 and the bases 19 of said standards. The standards 17 which extend through the ends of the bar 16 are provided with heads 20 between which an eccentric roller 21 is pivotally mounted, so as to bear against the top of the bar 16. The ends of the eccentric roller 21 are keyed to the operating handle 22, so that said handle when in upright position, as shown in Fig. 2, will cause the roller 21 to be turned in such position as to permit the springs 18 to raise the clamping shoes from engagement with the work; and when pulled forwardly and downwardly, said handle will turn the eccentric roller 21 so as to cause it to exert a cam-like movement against the bar 16, forcing the clamping shoes 15 against the work and thereby securely clamping said work upon the table 11. Thus the work will be clamped in position by pulling the handle 22 forwardly and downwardly and will release the work from the table upon pushing the handle to the upright position, as shown.

The table is caused to reciprocate upon the frame 10 by a driving means which has its source of power in the driving pulley 23, which pulley may be driven in any suitable manner from a source of power. The pulley 23 is keyed on the shaft 24 mounted in the bearings 25 secured to the supporting legs of the frame 10. Between said legs and keyed to said shaft 24, there are a plurality of driving pulleys 26 adapted to receive driving belts 27 for driving the cutter spindles, as will be hereinafter described. On the opposite end of the shaft 24 from the pulley 23, there is a pinion 28 in position to mesh with the gear 29 mounted upon the end of the frame 10, which in turn is in position to mesh with the gear 30 which is keyed upon the shaft 31 extending through said frame, and on the inner end of which there is keyed a pinion 32 shown in dotted lines in Fig. 4. The pinion 32 is positioned to mesh with the gear 33 mounted on the inside of the frame, as shown in Figs. 2 and 4. The driving mechanism up to and including the gear 33 remains in continuous rotation during the operation of the machine. For throwing the reciprocating means in and out of engagement with the driving mechanism, there is provided a clutch operated by the pedal 34 secured to the operating rod 35 rotatably mounted in the frame and extending crosswise thereof, as shown in Fig. 4, and having a bifurcated arm 36 connected therewith and engaging the sliding clutch collar 37 which is slidably keyed upon the shaft 38. The collar 37 is provided with a clutch member 39 adapted to slidably engage in the clutch member 40 forming a part of the gear 33, which gear is mounted to freely rotate upon the shaft 38. Therefore, upon depressing the pedal 34, the clutch members 39 and 40 are thrown into engagement so as to cause the gear 33 to rotate the shaft 38. The shaft 38 is provided on each end thereof with the eccentric flanges or disks 41 to which are pivoted the crank arms 42, said crank arms being pivotally connected with the lever 43, which lever is fulcrumed at 44 to the frame 10 and is provided on its free end with an arcuate toothed rack member 45 in position to engage and mesh with the rack 46 secured on the under side of the ends of the table 11. It will be observed, therefore, that upon depressing the pedal 34 and throwing the shaft 38 into engagement with the driving mechanism, the arcuate rack members on each end of the frame will be caused to swing back and forth and reciprocate the table 11 crosswise of the frame.

The table 11 comprises a plurality of recesses or openings 50 separated by cross bars 51, and having formed at each end of the openings 50 the slots 52. The openings 50 and the slots 52 are of varying size for enabling the work to be grooved at the desired intervals throughout its length. It may be assumed for illustration that it is desired to cut a single groove in a wooden end panel for receiving a corresponding tongue of a partition. However, as many grooves may be cut in the panel as there are pulleys 26, and said grooves may be spaced equidistant from each other or at varying distances as desired. As shown herein, for the purpose of cutting a single laterally extending groove in the wooden panel which may be clamped upon the table 11, there is a cutter guide bar 53, as shown in Figs. 1, 5, 6, 7 and 8. The guide bar 53 is provided with a longitudinal slot 54 and has its ends supported upon opposite sides of the table 11. The rear end of the guide bar is secured to the rear side of the table by passing the bolt 55 therethrough and through the slot 52 therein, and clamping the bolt down so as to maintain the rear end of the bar in fixed position, but permitting it to have a pivotal movement. The forward end of the bar is likewise connected with the forward side of the table 11 by the bolt 56 which extends therethrough and through the forward slot 52 and is clamped thereto by the nut 57, as shown in Fig. 8. The link 58 has one end pivoted upon the bolt 56, said end being provided with an eccentric projection 59 formed integral therewith and extending into a suitable opening in the bar 53. The other end of the link 58 is pivotally connected to the reciprocating bar 60, said link slidably resting upon the table 11. By means of this arrangement as the bar 60 is caused to move back and forth with respect to the table 11, the shifting links 58 will be caused to move to the positions shown in Figs. 5, 6 and 7, and by reason of the eccentric projections or cams 59 formed thereon and engaging in the bars 53, will cause said bars to be shifted to slightly angular positions. As shown in the drawings, Fig. 5 shows the bar 53 with its forward end thrown slightly to the right. Fig. 6 shows the bar in central or neutral position. Fig. 7 shows the bar with its forward end turned slightly to the left.

The grooving cutter head 61 is mounted upon the spindle 62 upon which is keyed the pulley 63 adapted to be driven by the belt 27. Said spindle 62 is supported in suitable bearings 64 which are supported upon the shaft 65 and adjustable vertically by means of the collar 66. The shaft 65 is mounted in the bearings 67 which in turn are mounted upon the rods 68 extending the length of the machine and supported by the frame. There may be any number of cutter head spindles supported in this manner upon said rod 68. While the spindle 62 may be varied in height by the collar 66, the normal vertical adjustment thereof is affected by the adjusting screw 69 extending into the bearing 67 and acting against the lower end of the shaft 65. This permits of vertical adjustment and of swinging movement of the spindle, which movement will be affected by the lateral swinging movement of the guide bars 53. The upper end of the spindle 62 is provided with a roller 70 which extends into the slot 54 in the guide bars 53, whereby the cutter head will be maintained in alignment therewith.

For operating the bar 60, and causing it to move back and forth longitudinally of the table, there is provided a projecting plate 71 extending forwardly from said bar in position to engage a crank arm 72 pivotally mounted on the front side of the frame, said crank arm being provided with a roller 73 for receiving the end of the plate 71 and being fulcrumed at 74. Upon the forward movement of the table, the plate 71 is caused to engage the roller 73 on the crank arm, causing the crank arm to move about the fulcrum point 74, whereby the other end thereof upon which the roller 75 is mounted will engage the arm 76 likewise secured to the bar 60 and force it laterally to the position shown in Fig. 7. The spring 77 is secured to the crank arm and the frame for returning the crank arm to normal position against the stop pin 78 upon the return movement of the table. When the table is carried to the opposite or rear position, a plate 79 engages the roller 80 mounted on the end of the crank arm 81 which is fulcrumed to the frame at 82, whereby the opposite end of said arm bearing the roller 83 will be brought to bear against the plate 84 mounted on the bar 60 and force it in the opposite direction or to the position shown in Fig. 5. A projection 85 is provided for forcing the crank arm 81 to normal position against the stop 86.

After the table has returned to starting position and has operated the crank arm 81, the groove cutting has been completed. It is, therefore, brought to rest so that the work may be removed by reason of the clutch members 39 and 40 being released. As above stated, the rotation of the shaft 38 causes the reciprocating movement of the table. One complete revolution of said shaft will cause the table to be carried from its initial or starting position forward and back again for completion of the cutting of the groove. Keyed to the shaft 38, there is a collar 87 having an arm 88 extending downwardly in position to engage an arm 89 secured on the clutch rod 35, whereby upon a complete revolution of the shaft 38, the arm 88 will be brought into engagement with the arm 89 and turn the clutch rod 35 so as to cause the bifurcated arms 36 of said clutch to release the clutch member 39 from the clutch member 40, as shown in Fig. 2.

In operation, the guide bars 53 are adjusted in the slots 52 to the position in which it is desired to cut the groove. The power is turned on so as to rapidly rotate the cutter head 61 and the work, comprising a wooden panel or the like, is clamped in position upon the table. The guide bar at the beginning of the operation is then in normal position, as shown in Figs. 1 and 5, wherein it extends at a slight angle to the medial line of the groove to be cut. As herein shown, the guide bar taken from the front to the rear extends from right to left. This angle is very slight, the forward part of the bar being probably one-sixteenth of an inch to the right of the rear part of the bar. The clutch is then thrown into engagement so as to cause the table to move forward, and as the table moves forward, the cutter head engages the under side of the work and cuts a groove therein. It will be noted that the cutter remains substantially stationary, while the work is moved with respect thereto. As the table moves forward, the cutter by reason of the guide bar by which it is guided is caused to bear to the left and cut a groove at an angle in accordance with the position of the guide bar. As the table approaches its extreme forward position, it operates the crank arm 72 which slowly moves the forward end of the guide bar 53 to central or normal position, as shown in Fig. 6. As it reaches this position, the cutter is cutting the rear end of the groove. Continued movement of the crank arm shifts the forward end of the guide bar 53 to the left, as shown in Fig. 7, and in this position the table returns so that the cutter head moves forward with respect to the work, cutting the groove at the opposite angle. This may best be shown in Fig. 9 showing the cutting paths of the cutter upon the forward and return movement of the work with respect thereto. For illustrative purposes, the angularity of the grooves shown herein has been exaggerated and a finished groove has been shown at 90. Upon the work being carried to its rear or starting position, the crank arm 81 is operated for causing the guide arm 53 to be thrown back to normal position, shown in Fig. 5, after the cutter head has completed its work and become disengaged.

The invention claimed is:

1. In a machine of the character described, the combination with means for supporting the work to be grooved upon said machine, of a single cutter head adapted to engage and cut an undercut tapered groove of constant depth in said work, means for driving said cutter head and causing said cutter head and work to move relative to each other the length of the groove to be cut, and means actuated by said machine for causing said cutter head to be guided throughout said movement for cutting said work in varying directions.

2. In a machine of the character described, the combination with means for supporting the work to be grooved upon said machine, of a single cutter head adapted to engage and cut a groove in said work, means for driving said cutter head and causing said cutter head and work to move relative to each other the length of the groove to be cut, and means actuated by said machine for varying the position of said cutter head from one side to the other of the medial line of movement.

3. In a machine of the character described, the combination with means for supporting the work to be grooved upon said machine, of a single cutter head adapted to engage and cut a groove in said work, means for driving said cutter head and causing said cutter head and work to move relative to each other the length of the groove to be cut, and means actuated by said machine for causing said cutter head to start its cutting operation to one side of the center line through the groove to be cut and complete its cutting operation on the other side thereof and maintaining a constant depth throughout its cutting movement.

4. In a machine of the character described, the combination with means for supporting the work to be grooved upon said machine, of a single cutter head adapted to engage and cut a groove in said work, means for driving said cutter head and causing said cutter head and work to move relative to each other the length of the groove to be cut, and means actuated by said machine for causing said cutter head to travel with respect to said work during its cutting operation at an angle to the center line through the groove to be cut when cutting in one direction, and at the opposite angle thereto when cutting said groove in the other direction.

5. A machine for cutting a tapered undercut groove of constant depth in a piece of work, comprising a single cutter head, means for driving said head, means for moving said head and work relative to each other, and means controlled by said machine for guiding the relative movement of said cutter head and table so as to cause said cutter head to cut in a path directed at an angle to the center line of the groove to be cut so that the center of said path will coincide with the center of the finished groove at the farther extremity thereof, and will cut said work in a return path directed at an angle away from said center line, said paths being substantially V-shaped and overlapping so as to form a single tapered groove.

6. A machine for cutting a wedged-shaped undercut groove of constant depth in a piece of work having a cutter head, means for rotating said head, and means controlled by said machine for moving said head and work relative to each other, whereby said head will enter the work for grooving the same on one side of the center line through the groove to be cut and cut in a path directed at an angle thereto, the center of said path coinciding with said line upon the cutter reaching the farther extremity of the groove to be cut, and then causing said cutter head to cut in a return path directed at an angle away from said line so as to complete the cutting of said tapered groove by causing the paths of travel of the cutter head to coincide at one end and overlap at the other end of the groove.

7. In a machine of the character described, the combination with work to be grooved, of means for supporting said work upon said machine, a cutter head adapted to engage and cut a groove in said work, means for driving said cutter head and causing said cutter head and work to move relative to each other the length of the groove to be cut, an adjustable guide bar having a slot therein through which said cutter head extends, and means actuated by said machine for moving one end of said bar for varying the direction of movement of said cutter head with respect to the work upon the cutter head having reached the end of its travel in one direction.

8. In a machine of the character described, the combination with a table for supporting the work to be grooved, a cutter head adapted to engage and cut a groove in said work, means for driving said cutter head and causing said cutter head and table to move relative to each other, a guide bar pivoted at one end to said table and slidably supported thereon at the other end, said bar being adapted to engage and guide said cutter head, and means actuated by said machine and connected with the free end of said bar for moving it laterally about its pivot point upon the cutter head having reached the end of its travel in one direction, whereby the direction of relative movement between the cutter head and table will be varied.

9. In a machine of the character described, the combination with a table for supporting the work to be grooved, of means for rigidly securing said work upon the table, a cutter head adapted to engage and cut a groove in said work, means for driving said cutter head and causing said cutter head and table to move relative to each other, a guide bar pivoted at one end to said table and slidably supported thereon at the other end, said bar being adapted to engage and guide said cutter head, and means in engagement with the free end of said bar for moving the same about its pivot point, said means being automatically controlled by the movement of said table.

10. In a machine of the character described, the combination with a table for supporting the work to be grooved, of means for rigidly securing said work upon the table, a cutter head adapted to engage and cut a groove in said work, means for driving said cutter head and causing said cutter head and table to move relative to each other, a guide bar pivoted at one end to said table and slidably supported thereon at the other end, said bar being adapted to engage and guide said cutter head, a lever pivoted on said table and provided with an eccentric portion in engagement with the free end of said guide bar, and means for moving the free end of said lever so as to turn said eccentric and thereby vary the position of the free end of said guide bar.

11. In a machine of the character described, the combination with a table for supporting the work to be grooved, of means for rigidly securing said work upon the table, a cutter head adapted to engage and cut a groove in said work, means for driving said cutter head and causing said cutter head and table to move relative to each other, a guide bar pivoted at one end to said table and slidably supported thereon at the other end, said bar being adapted to engage and guide said cutter head, a lever pivoted on said table and provided with an eccentric portion in engagement with the free end of said guide bar, and means connected with the free end of said lever adapted to be actuated by the movement of said table, whereby upon said table reaching substantially one extreme position, said lever will be turned for causing the shifting of said bar to one side of normal position; and when said table reaches the substantially opposite extreme position, said lever will be moved for shifting the free end of said bar to the opposite side of normal position.

12. In a machine of the character described, the combination with a table for supporting the work to be grooved, of means for rigidly securing said work upon the table, a cutter head adapted to engage and cut a groove in said work, means for rotating said cutter head, means for reciprocating said table, a guide bar mounted on said table and having one end pivoted thereon, said bar having a longitudinal slot through which said cutter head extends, a shifting lever having one end pivoted to said table and provided with a cam surface in engagement with the free end of said guide bar, whereby upon the pivotal movement of said lever, said guide bar will be shifted from one side to the other, and means actuated by the movement of said table for causing the shifting of said lever.

13. In a machine of the character described, the combination with a table for supporting the work to be grooved, of means for rigidly securing said work upon the table, a cutter head adapted to engage and cut a groove in said work, means for rotating said cutter head, means for reciprocating said table, a guide bar mounted on said table and having one end pivoted thereon, said bar having a longitudinal slot through which said cutter head extends, a shifting lever having one end pivoted to said table and provided with a cam surface in engagement with the farther end of said guide bar, whereby upon the pivotal movement of said lever, said guide bar will be shifted from one side to the other, and a shifting bar to which the other end of said shifting lever is pivoted adapted to shift said lever from one position to the other for shifting said guide bar upon said table reaching substantially the limit of its movement in either direction.

14. In a machine of the character described, the combination with a table for supporting the work to be grooved, of means for rigidly securing said work upon the table, a cutter head adapted to engage and cut a groove in said work, means for rotating said cutter head, means for reciprocating said table, a guide bar mounted on said table and having one end pivoted thereon, said bar having a longitudinal slot through which said cutter head extends, a shifting lever having one end pivoted to said table and provided with a cam surface in engagement with the farther end of said guide bar, whereby upon the pivotal movement of said lever, said guide bar will be shifted from one side to the other, a shifting bar slidably mounted in connection with said table to which the other end of said shifting lever is pivoted for actuating said lever, and a pair of crank arms fulcrumed on said machine in position to be engaged and actuated by said table upon reaching substantially the limit of movement thereof in either direction and engaging and moving said shifting bar first in one direction and then in the other direction, substantially as described.

In witness whereof, I have hereunto affixed my signature.

HENRY W. BERTRAM.